US012785086B2

(12) United States Patent
Yadav et al.

(10) Patent No.: US 12,785,086 B2
(45) Date of Patent: Nov. 3, 2026

(54) CATHODE ACTIVE MATERIAL WITH COATING LAYER INCLUDING A TRANSITION METAL OXIDE FOR CATHODE ELECTRODES

(71) Applicant: GM GLOBAL TECHNOLOGY OPERATIONS LLC, Detroit, MI (US)

(72) Inventors: Vamakshi Yadav, Sterling Heights, MI (US); Devendrasinh Darbar, Sterling Heights, MI (US); Wei Li, Troy, MI (US); Yuntao Gu, Farmington Hills, MI (US); Raneen Taha, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 626 days.

(21) Appl. No.: 18/347,135

(22) Filed: Jul. 5, 2023

(65) Prior Publication Data

US 2025/0015266 A1 Jan. 9, 2025

(51) Int. Cl.

| | |
|---|---|
| ***H01M 4/505*** | (2010.01) |
| ***H01M 4/04*** | (2006.01) |
| ***H01M 4/36*** | (2006.01) |
| ***H01M 4/62*** | (2006.01) |
| *H01M 4/02* | (2006.01) |

(52) U.S. Cl.

CPC .......... *H01M 4/366* (2013.01); *H01M 4/0471* (2013.01); *H01M 4/505* (2013.01); *H01M 4/62* (2013.01); *H01M 2004/021* (2013.01); *H01M 2004/028* (2013.01)

(58) Field of Classification Search

None

See application file for complete search history.

(56) References Cited

U.S. PATENT DOCUMENTS

| | | | | |
|---|---|---|---|---|
| 2013/0309580 | A1 | 11/2013 | Tomura | |
| 2015/0214550 | A1 | 7/2015 | Song et al. | |
| 2020/0239328 | A1* | 7/2020 | Li | C01G 53/50 |
| 2021/0020900 | A1 | 1/2021 | Yamamoto et al. | |
| 2021/0159496 | A1* | 5/2021 | Mitsumoto | H01M 4/131 |
| 2022/0352511 | A1 | 11/2022 | Qi et al. | |

(Continued)

FOREIGN PATENT DOCUMENTS

| | | |
|---|---|---|
| CN | 103 633 329 A | 3/2014 |
| CN | 108 172 821 A | 6/2018 |

(Continued)

OTHER PUBLICATIONS

Office Action dated Feb. 17, 2024 from German Patent Office for German Patent No. 10 2023 128 143.7; 10 pages.

(Continued)

*Primary Examiner* — Carlos Barcena

(57) ABSTRACT

A cathode active material layer for a cathode electrode of a battery cell, comprising particles of cathode active material including one or more materials selected from a group consisting of a lithium- and manganese-rich (LMR) material, lithium nickel manganese cobalt oxide (NMC), lithium nickel manganese cobalt aluminum oxide (NMCA), and lithium iron phosphate (LFP). A coating layer is formed on an outer surface of the particles of the cathode active material and including one or more transition metal oxides.

19 Claims, 3 Drawing Sheets

(56) References Cited

U.S. PATENT DOCUMENTS

| | | | |
|---|---|---|---|
| 2023/0048577 | A1 | 2/2023 | Qi et al. |
| 2023/0129069 | A1 | 4/2023 | Qi et al. |

FOREIGN PATENT DOCUMENTS

| | | | | | |
|---|---|---|---|---|---|
| CN | 108 417 790 | A | | 8/2018 | |
| CN | 109 037 619 | A | | 12/2018 | |
| CN | 109 879 330 | A | | 6/2019 | |
| CN | 113078316 | A | * | 7/2021 | ............ H01M 4/366 |
| JP | 2020 53 250 | A | | 4/2020 | |
| JP | 2021 18 982 | A | | 2/2021 | |

OTHER PUBLICATIONS

U.S. Appl. No. 17/742,037, filed May 11, 2022, Qi et al.
U.S. Appl. No. 17/853,363, filed Jun. 29, 2022, Wang et al.
U.S. Appl. No. 17/882,936, filed Aug. 8, 2022, Qi et al.
U.S. Appl. No. 17/897,959, filed Aug. 29, 2022, Jiang et al.
U.S. Appl. No. 17/976,400, filed Oct. 28, 2022, Wang et al.
U.S. Appl. No. 17/978,462, filed Nov. 1, 2022, Wang et al.
U.S. Appl. No. 18/102,836, filed Jan. 30, 2023, Wang et al.

* cited by examiner

CATHODE ACTIVE MATERIAL WITH COATING LAYER INCLUDING A TRANSITION METAL OXIDE FOR CATHODE ELECTRODES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to a coated cathode active material for a cathode electrode of a battery cell.

Electric vehicles (EVs) such as battery electric vehicles (BEVs), hybrid vehicles, and/or fuel cell vehicles include one or more electric machines and a battery system including one or more battery cells, modules and/or packs. A battery control module is used to control charging and/or discharging of the battery system during charging and/or driving. Manufacturers of EVs are pursuing increased power density to increase the range of the EVs.

SUMMARY

A cathode active material layer for a cathode electrode of a battery cell, comprising particles of cathode active material including one or more materials selected from a group consisting of a lithium- and manganese-rich (LMR) material, lithium nickel manganese cobalt oxide (NMC), lithium nickel manganese cobalt aluminum oxide (NMCA), and lithium iron phosphate (LFP). A coating layer is formed on an outer surface of the particles of the cathode active material and including one or more transition metal oxides.

In other features, the one or more transition metal oxides are selected from a group consisting of ammonium tungstate ($(NH_4)_2WO_4$), lithium tungstate ($Li_2WO_4$), potassium tungstate ($K_2WO_4$), sodium tungstate ($Na_2WO_4$), ammonium molybdate ($(NH_4)_2MoO_4$), potassium molybdate ($K_2MoO_4$), lithium molybdate ($Li_2MoO_4$), sodium molybdate ($Na_2MoO_4$), ammonium vanadate ($NH_4VO_3$), lithium vanadate ($LiVO_3$), potassium vanadate ($KVO_3$), sodium vanadate ($NaVO_3$), ammonium chromate ($(NH_4)_2CrO_4$), lithium chromate ($Li_2CrO_4$), potassium chromate ($K_2CrO_4$), sodium chromate ($Na_2CrO_4$), and combinations thereof.

In other features, the coating layer has a thickness in a range from 0.5 nm to 20 nm. The one or more transition metal oxides comprises 0.01 wt % to 2 wt % of the particles after coating. The cathode active material comprises the LMR material and the coating layer comprises $Li_2MoO_4$.

A cathode electrode comprises a cathode current collector. The cathode active material layer arranged on at least one side of the cathode current collector.

A battery cell includes one or more of the cathode current collector, one or more anode electrodes, and one or more separators.

A method for making a cathode active material for a battery cell includes providing particles of cathode active material selected from a group consisting of a lithium- and manganese-rich (LMR) material, lithium nickel manganese cobalt oxide (NMC), lithium nickel manganese cobalt aluminum oxide (NMCA), and lithium iron phosphate (LFP); and coating an outer surface of the particles of the cathode active material with a coating layer including one or more transition metal oxides. The one or more transition metal oxides are selected from a group consisting of ammonium tungstate ($(NH_4)_2WO_4$), lithium tungstate ($Li_2WO_4$), potassium tungstate ($K_2WO_4$), sodium tungstate ($Na_2WO_4$), ammonium molybdate ($(NH_4)_2MoO_4$), potassium molybdate ($K_2MoO_4$), lithium molybdate ($Li_2MoO_4$), sodium molybdate ($Na_2MoO_4$), ammonium vanadate ($NH_4VO_3$), lithium vanadate ($LiVO_3$), potassium vanadate ($KVO_3$), sodium vanadate ($NaVO_3$), ammonium chromate ($(NH_4)_2CrO_4$), lithium chromate ($Li_2CrO_4$), potassium chromate ($K_2CrO_4$), sodium chromate ($Na_2CrO_4$), and combinations thereof.

In other features, the one or more transition metal oxides comprise 0.01 wt % to 2 wt % of the particles after coating. The cathode active material comprises the LMR material. The cathode active material comprises the LMR material and the coating layer comprises $Li_2MoO_4$.

In other features, coating the outer surface of the particles includes adding the particles to an aqueous solution including the one or more transition metal oxides; and stirring the aqueous solution for a first predetermined period at a first predetermined temperature.

In other features, the first predetermined period is in a range from 60 to 600 minutes. The first predetermined temperature is in a range from 10° C. to 30° C. Coating the outer surface of the particles includes heating the aqueous solution after the first predetermined period for a second predetermined period at a second predetermined temperature.

In other features, the second predetermined period is in a range from 20 to 120 minutes. The second predetermined temperature is in a range from 60° C. to 100° C. Coating the outer surface of the particles further includes performing calcination at a third predetermined temperature for a third predetermined period.

In other features, the third predetermined temperature is in a range from 200° C. to 600° C. The third predetermined period is in a range from 20 to 300 minutes.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While battery cells including cathode electrodes with coated cathode active material are described in the context of electric vehicles, the battery cells can be used in stationary applications and/or in other types of applications.

A battery module includes one or more battery cells including anode electrodes, cathode electrodes, and separators arranged in a predetermined sequence. The anode electrodes include an anode current collector and an anode active material layer arranged on one or both sides of the anode current collector. The cathode electrodes include a cathode current collector and a cathode active material layer arranged on one or both sides of the cathode current collector. The separators are arranged between the anode and cathode electrodes.

For lithium- and manganese-rich (LMR) batteries, the cathode active material includes lithium- and manganese-rich (LMR) cathode active material. Lithium- and manganese-rich (LMR) materials have a higher specific capacity than traditional cathode materials such as lithium ion phosphate (LFP). However, limited cycle life of LMR cathode electrodes due to detrimental reactions at a cathode-electrolyte interface remains a challenge.

The LMR batteries have high average operating voltages and high reversible capacities. However, the LMR batteries experience capacity fading and voltage decay due to electrolyte consumption and/or the structural transformation from a layered phase to a spinel phase.

The present disclosure relates to a method for creating a coating layer on particles of a cathode active material such as LMR or other cathode materials. The coating layer forms a barrier to mitigate the detrimental reactions at the cathode-electrolyte interface and improve the cycle life of LMR cathode materials.

The coating layer is a self-limiting layer formed on the surface of particles of the cathode active material. For example, when the coated LMR cathode active material is coated with lithium molybdate, the discharge capacity retention of the battery cell significantly improves as compared with an uncoated LMR cathode active material. The coating layer also improves cycle life of LMR cathode electrodes by reducing interactions at the cathode-electrolyte interface. The self-limiting coating layer also enables good ionic conductivity. The present disclosure also relates to a low-cost, water-based process for coating the particles of the LMR cathode active material.

Figure 1:
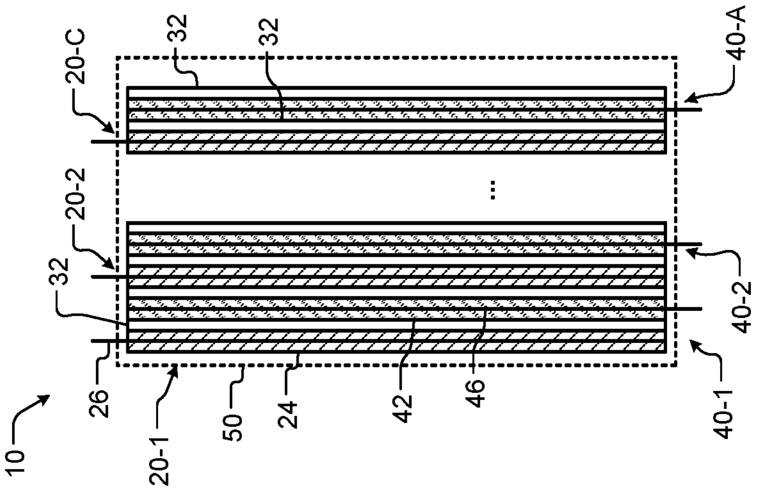
FIG. 1 is a side cross section of an example of a battery cell including cathode electrodes including cathode active material coated with a transition metal oxide according to the present disclosure.

Referring now to FIG. 1, a battery cell 10 includes cathode electrodes 20-1, 20-2, . . . , and 20-C, where C is an integer greater than one. The cathode electrodes 20 include a cathode active material layer 24 arranged on one or both sides of cathode current collectors 26. Particles of the cathode active material are coated with a coating layer including one or more transition metal oxides.

The battery cell 10 includes anode electrodes 40-1, 40-2, . . . , and 40-A, where A is an integer greater than one. The anode electrodes 40 include an anode active material layer 46 arranged on one or both sides of anode current collectors 42. The cathode electrodes 20, the anode electrodes 40 and the separators 32 are arranged in a predetermined order in an enclosure 50. For example, separators 32 are arranged between the cathode electrodes 20 and the anode electrodes 40.

In some examples, particles of the cathode active material (e.g., LMR or other cathode active material) are coated with a coating layer (e.g., lithium molybdate ($Li_2MoO_4$) or other transition metal oxide). In some examples, the one or more transition metal oxide precursors are selected from a group consisting of ammonium tungstate ($(NH_4)_2WO_4$), lithium tungstate ($Li_2WO_4$), potassium tungstate ($K_2WO_4$), sodium tungstate ($Na_2WO_4$), ammonium molybdate ($(NH_4)_2MoO_4$), potassium molybdate ($K_2MoO_4$), lithium molybdate ($Li_2MoO_4$), sodium molybdate ($Na_2MoO_4$), ammonium vanadate ($NH_4VO_3$), lithium vanadate ($LiVO_3$), potassium vanadate ($KVO_3$), sodium vanadate ($NaVO_3$), ammonium chromate ($(NH_4)_2CrO_4$), lithium chromate ($Li_2CrO_4$), potassium chromate ($K_2CrO_4$), sodium chromate ($Na_2CrO_4$), and combinations thereof.

In some examples, the cathode active material may include LMR materials or cathode active materials other than LMR such as nickel manganese cobalt (NMC), nickel manganese cobalt aluminum (NCMA), lithium iron phosphate (LFP) and/or combinations thereof.

Figure 3:
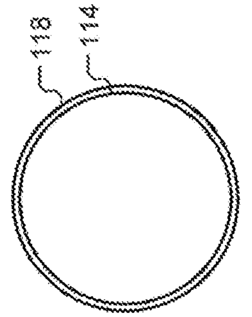
FIG. 3 is a side cross section of an example of the cathode active material after coating with the transition metal oxide according to the present disclosure.
Figure 2:
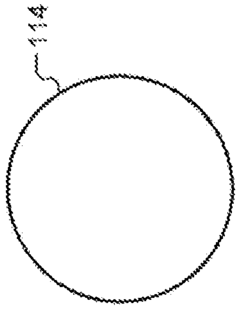
FIG. 2 is a side cross section of an example the cathode active material prior to coating according to the present disclosure.
Figure 4:
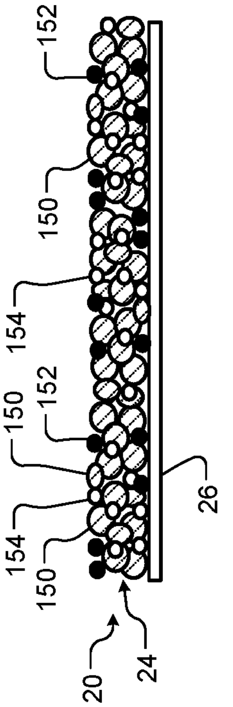
FIG. 4 is a side cross sectional view of a cathode electrode including cathode active material that is coated with a transition metal oxide layer according to the present disclosure.

Referring now to FIGS. 2 to 4, a coating layer is formed on particles of the cathode active material. In FIG. 2, a particle 114 of the cathode active material is shown. In some examples, the particle 114 has a diameter in a range from 5 μm to 80 μm. In FIG. 3, the particle 114 is shown coated with a coating layer 118 (e.g., lithium molybdate and/or one or more other transition metal oxide precursors described herein). In some examples, the coating layer 118 has a thickness in a range from 0.5 nm to 20 nm. In other examples, the coating layer 118 has a thickness in a range from 1 nm to 10 nm.

In FIG. 4, in some examples the coated cathode active material 150 is mixed with binder 152, conductive additive(s) 154, and/or solvent to create a slurry. The slurry is applied to one or both sides of the cathode current collector 26 to form the cathode active material layer 24 of the cathode electrode 20. The cathode electrode 20 is arranged in a battery cell along with the anode electrodes and separators (e.g., the battery cell 10 shown in FIG. 1).

Figure 5:
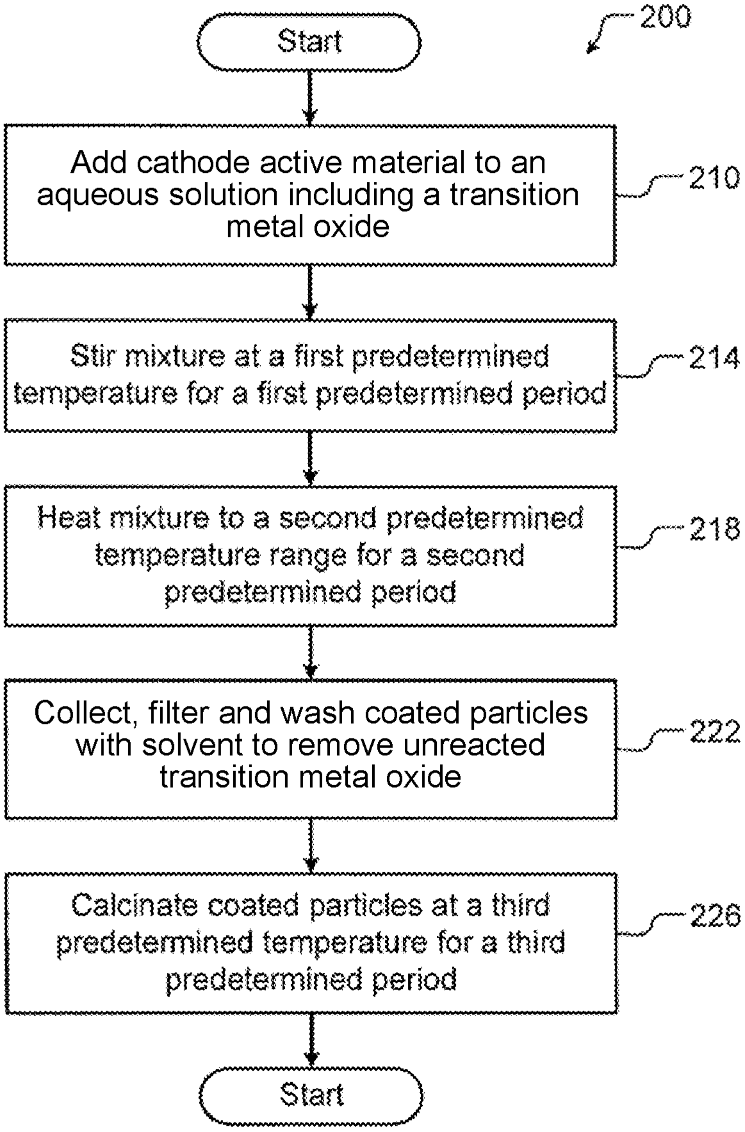
FIG. 5 is an example of a method for coating the cathode active material with a transition metal oxide layer according to the present disclosure.

Referring now to FIG. 5, a method 200 for making the cathode active material is shown. At 210, cathode active material powder or particles are added to an aqueous solution including one or more transition metal oxide precursors (e.g., lithium molybdate ($Li_2MoO_4$) and/or other transition metal oxide precursors).

At 214, the mixture is stirred in a container at a first predetermined temperature for a first predetermined period. In other examples, sonication is performed. In some examples, the first predetermined temperature is in a range from 10° C. to 30° C. (e.g., room temperature (20° C. to 22° C.)). In some examples, the first predetermined period is in a range from 60 to 600 minutes (e.g., 120 minutes).

At 218, the mixture is heated at a second predetermined temperature for a second predetermined period. In some examples, the second predetermined temperature is in a range from 60° C. to 100° C. (e.g., 75° C.). In some examples, the second predetermined period is in a range from 20 to 120 minutes (e.g., 60 minutes).

At 222, coated particles are collected, filtered, and washed with solvent (e.g., water or another solvent) to remove unreacted transition metal oxide. At 226, coated particles are calcined or heated at a third predetermined temperature for a third predetermined period. In some examples, the third predetermined temperature is in a range from 200° C. to 600° C. (e.g., 450° C.). In some examples, the third predetermined period is in a range from 20 to 300 minutes (e.g., 120 minutes).

Figure 6:
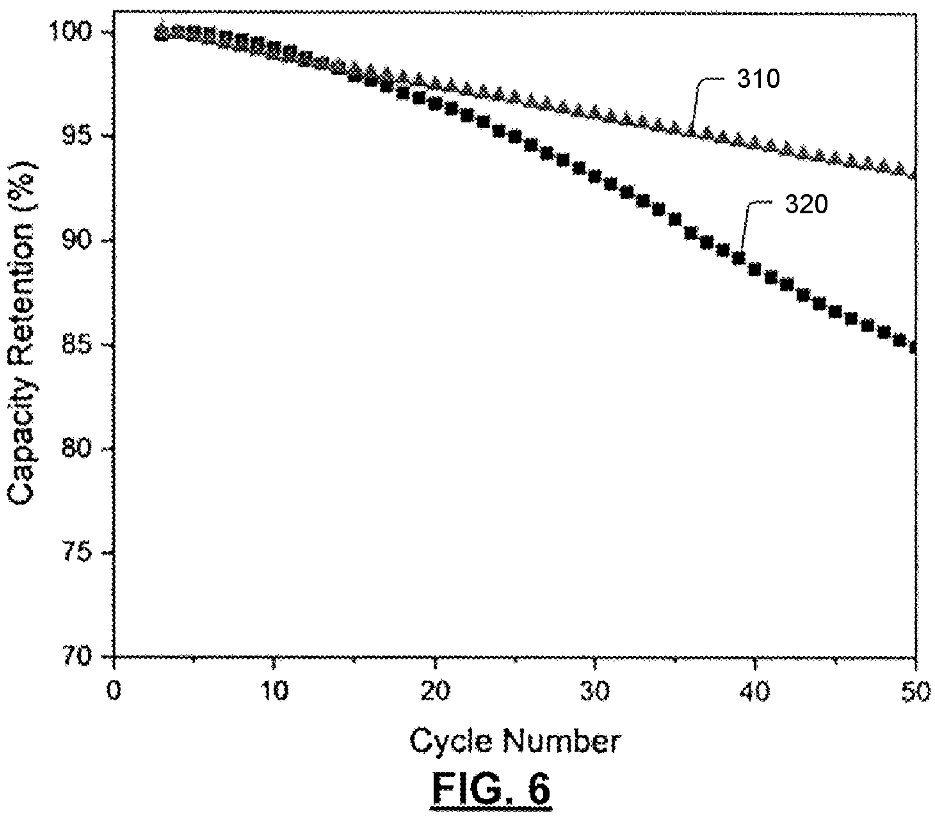
FIG. 6 is a graph illustrating capacity retention as a function of cycles for cathode active material that is coated with a lithium molybdate layer and uncoated cathode active material.
Figure 7:
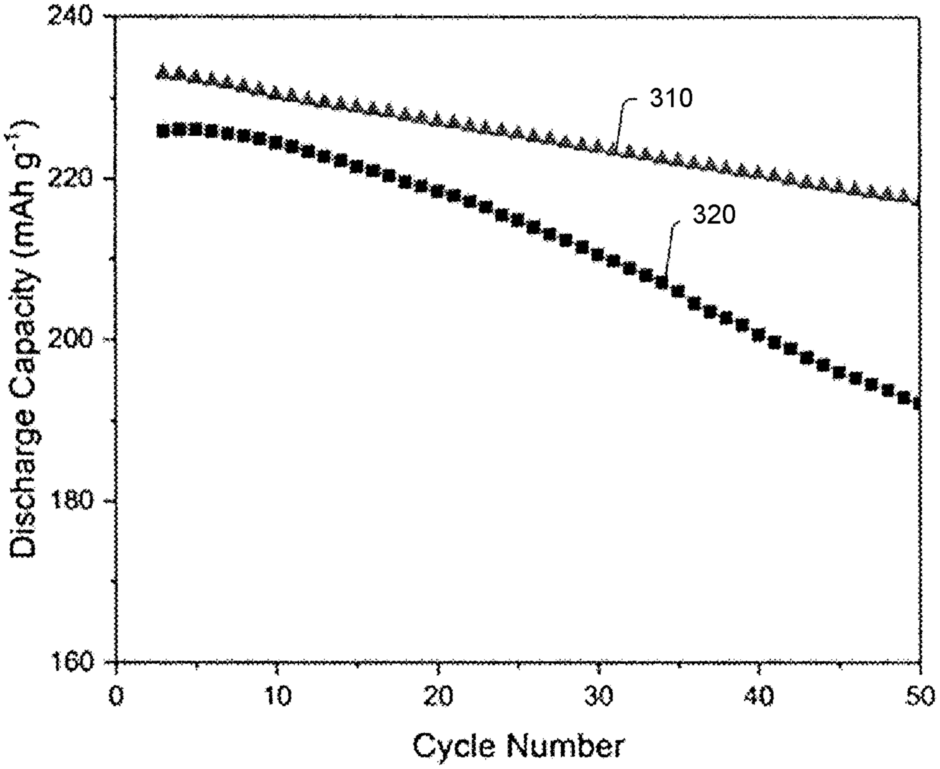
FIG. 7 is a graph illustrating capacity retention as a function of cycles for cathode active material that is coated with lithium molybdate and uncoated cathode active material.

Referring now to FIGS. 6 and 7, performance of battery cells including cathode electrodes with coated particles 310 (e.g., lithium molybdate ($Li_2MoO_4$)) and uncoated particles 320 are shown. A half-cell was constructed with the particles including LMR, carbon black (CB), and polyvinylidene difluoride (PVDF) at ratio of 94/3/3 wt %. The first cycle efficiency for the coated particles 310 was 85.8% and for the uncoated particles 320 was 82.5%. In FIG. 6, the coated particles 310 have a capacity retention after 50 cycles of 93%. The uncoated particles have a capacity retention after 50 cycles of 85%.

In FIG. 7, the discharge capacity is higher for the coated particles 310 as compared to the uncoated particles 320. The first C/3 cycle discharge capacity was 233 mAh/g for the coated particles 310 and 226 mAh/g for the uncoated particles 320. The formation cycle protocol was constant current charging (CCC) at C/20 to 4.6V and constant voltage charging (CVC) at 4.6V until C/20. Discharge was at CC at C/20 to 2.0V. The life cycle protocol was CCC at C/3 to 4.6V and CVC at 4.6V until C/20. Discharge was at CC at C/3 to 2.0V.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for making a cathode active material for a battery cell, comprising:

providing particles of cathode active material including one or more materials selected from a group consisting of a lithium- and manganese-rich (LMR) material, lithium nickel manganese cobalt oxide (NMC), lithium nickel manganese cobalt aluminum oxide (NMCA), and lithium iron phosphate (LFP); and coating an outer surface of the particles of the cathode active material with a coating layer including one or more transition metal oxides, wherein coating the outer surface of the particles includes adding the particles to an aqueous solution having the one or more transition metal oxides, and stirring the aqueous solution for a first predetermined period at a first predetermined temperature, and wherein the first predetermined period is in a range from 60 to 600 minutes, wherein the coating layer has a thickness in a range from 0.5 nm to 20 nm, and wherein the one or more transition metal oxides comprises 0.01 wt % to 2 wt % of the particles after coating.

2. The method of claim 1, wherein the one or more transition metal oxides are selected from a group consisting of ammonium tungstate ($(NH_4)_2WO_4$), lithium tungstate ($Li_2WO_4$), potassium tungstate ($K_2WO_4$), sodium tungstate ($Na_2WO_4$), ammonium molybdate ($(NH_4)_2MoO_4$), potassium molybdate ($K_2MoO_4$), lithium molybdate ($Li_2MoO_4$), sodium molybdate (Na2MoO4), ammonium vanadate ($NH_4VO_3$), lithium vanadate ($LiVO_3$), potassium vanadate ($KVO_3$), sodium vanadate ($NaVO_3$), ammonium chromate ($(NH_4)_2CrO_4$), lithium chromate ($Li_2CrO_4$), potassium chromate ($K_2CrO_4$), sodium chromate ($Na_2CrO_4$), and combinations thereof.

3. The method of claim 1, wherein the cathode active material comprises the LMR material and the coating layer comprises $Li_2MoO_4$.

4. A method for making a cathode active material for a battery cell, comprising:

providing particles of cathode active material selected from a group consisting of a lithium- and manganese-rich (LMR) material, lithium nickel manganese cobalt oxide (NMC), lithium nickel manganese cobalt aluminum oxide (NMCA), and lithium iron phosphate (LFP); and coating an outer surface of the particles of the cathode active material with a coating layer including one or more transition metal oxides, wherein coating the outer surface of the particles includes adding the particles to an aqueous solution having the one or more transition metal oxides, stirring the aqueous solution for a first predetermined period at a first predetermined temperature, and heating the aqueous solution after the first predetermined period for a second predetermined period at a second predetermined temperature, wherein the one or more transition metal oxides are selected from a group consisting of ammonium tungstate ((NH4)2WO4), lithium tungstate (Li2WO4), potassium tungstate (K2WO4), sodium tungstate (Na2WO4), ammonium molybdate ((NH4)2MoO4), potassium molybdate (K2MoO4), lithium molybdate (Li2MoO4), sodium molybdate (Na2MoO4), ammonium vanadate (NH4VO3), lithium vanadate (LiVO3), potassium vanadate (KVO3), sodium vanadate (NaVO3), ammonium chromate ((NH4)2CrO4), lithium chromate (Li2CrO4), potassium chromate (K2CrO4), sodium chromate (Na2CrO4), and combinations thereof.

5. The method of claim 4, wherein the one or more transition metal oxides comprise 0.01 wt % to 2 wt % of the particles after coating.

6. The method of claim 4, wherein the cathode active material comprises the LMR material.

7. The method of claim 4, wherein the cathode active material comprises the LMR material and the coating layer comprises $Li_2MoO_4$.

8. The method of claim 4, wherein the first predetermined period is in a range from 60 to 600 minutes.

9. The method of claim 4, wherein the first predetermined temperature is in a range from 10° C. to 30° C.

10. The method of claim 4, wherein the second predetermined period is in a range from 20 to 120 minutes.

11. The method of claim 4, wherein the second predetermined temperature is in a range from 60° C. to 100° C.

12. The method of claim 4, wherein coating the outer surface of the particles further includes performing calcination at a third predetermined temperature for a third predetermined period.

13. The method of claim 12, wherein the third predetermined temperature is in a range from 200° C. to 600° C.

14. The method of claim 12, wherein the third predetermined period is in a range from 20 to 300 minutes.

15. A method for making a cathode active material for a battery cell, comprising:

providing particles of cathode active material including one or more materials selected from a group consisting of a lithium- and manganese-rich (LMR) material, lithium nickel manganese cobalt oxide (NMC), lithium nickel manganese cobalt aluminum oxide (NMCA), and lithium iron phosphate (LFP), wherein the cathode active material includes particles having a diameter in a range from 5 μm to 80 μm; and coating an outer surface of the particles of the cathode active material with a coating layer including one or more transition metal oxides, wherein coating the outer surface of the particles includes adding the particles to an aqueous solution having the one or more transition metal oxides, stirring the aqueous solution for a first predetermined period at a first predetermined temperature, wherein the first predetermined temperature is in a range from 10° C. to 30° C., wherein the coating layer has a thickness in a range from 0.5 nm to 20 nm, and wherein the transition metal oxide comprises 0.01 wt % to 2 wt % of the particles after coating.

16. The method of claim 15, wherein the cathode active material comprises the LMR material.

17. The method of claim 15, wherein the cathode active material comprises the LMR material and the coating layer comprises $Li_2MoO_4$.

18. The method of claim 15, wherein the one or more transition metal oxides are selected from a group consisting of ammonium tungstate ($(NH_4)_2WO_4$), lithium tungstate ($Li_2WO_4$), potassium tungstate ($K_2WO_4$), sodium tungstate ($Na_2WO_4$), ammonium molybdate ($(NH_4)_2MoO_4$), potassium molybdate ($K_2MoO_4$), lithium molybdate ($Li_2MoO_4$), sodium molybdate (Na2MoO4), ammonium vanadate ($NH_4VO_3$), lithium vanadate ($LiVO_3$), potassium vanadate ($KVO_3$), sodium vanadate ($NaVO_3$), ammonium chromate ($(NH_4)_2CrO_4$), lithium chromate ($Li_2CrO_4$), potassium chromate ($K_2CrO_4$), sodium chromate ($Na_2CrO_4$), and combinations thereof.

19. The method of claim 15, wherein the first predetermined period is in a range from 60 to 600 minutes.

* * * * *